US011995473B2

(12) United States Patent
Moatti et al.

(10) Patent No.: US 11,995,473 B2
(45) Date of Patent: May 28, 2024

(54) SYSTEM AND APPARATUS FOR FaaS BUSINESS GOALS OPTIMIZATION

(71) Applicant: International Business Machines Corporation, Armonk, NY (US)

(72) Inventors: Yosef Moatti, Haifa (IL); David Breitgand, Modiin (IL)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 17/386,585

(22) Filed: Jul. 28, 2021

(65) Prior Publication Data

US 2023/0036476 A1 Feb. 2, 2023

(51) Int. Cl.
*G06F 9/50* (2006.01)

(52) U.S. Cl.
CPC .................................. *G06F 9/5027* (2013.01)

(58) Field of Classification Search
CPC ....................................................... G06F 9/5027
See application file for complete search history.

(56) References Cited

U.S. PATENT DOCUMENTS

| | | | |
|---|---|---|---|
| 10,671,360 B1 * | 6/2020 | Todd | G06F 9/5072 |
| 2017/0124513 A1 | 5/2017 | Boss | |
| 2018/0375712 A1 * | 12/2018 | Kröhling | H04L 67/561 |
| 2019/0349447 A1 * | 11/2019 | Adams | G06F 9/547 |
| 2020/0052982 A1 | 2/2020 | Nainar | |
| 2020/0225983 A1 * | 7/2020 | Jung | G06F 9/5027 |
| 2021/0132947 A1 * | 5/2021 | John | G06N 20/00 |

(Continued)

FOREIGN PATENT DOCUMENTS

| | | |
|---|---|---|
| CN | 101969475 A | 2/2011 |
| CN | 111209084 A | 5/2020 |
| WO | WO 2019090523 A1 * | 5/2019 ............. H04L 12/46 |

OTHER PUBLICATIONS

Erwin van Eyk, Alexandru Iosup, Simon Seif, Markus Thommes, The SPEC Cloud Group's Research Vision on FaaS and Serverless Architectures, WoSC '17: Proceedings of the 2nd International Workshop on Serverless Computing, Dec. 11, 2017, pp. 1-4, https://doi.org/10.1145/3154847.3154848.

(Continued)

*Primary Examiner* — Charles E Anya
(74) *Attorney, Agent, or Firm* — Andre Adkins

(57) ABSTRACT

Embodiments may include novel techniques to communicate user preferences to the FaaS provider so as to provide full applicability of FaaS for business critical applications and to provide full realization of the FaaS model flexibility. For example, in an embodiment, a method may be implemented in a computer system comprising a processor, memory accessible by the processor, and computer program instructions stored in the memory and executable by the processor, and the method may comprise receiving a request for processing of a computing task and associated data indicating a context of an overall process flow for the computing task, wherein the request for processing is a function invocation for a FaaS computing system, evaluating the data indicating the context and scheduling computing resources for performing the computing task based on the data indicating the context, and performing the computing task using the scheduled computing resources.

9 Claims, 4 Drawing Sheets

(56) References Cited

U.S. PATENT DOCUMENTS

| | | |
|---|---|---|
| 2021/0200596 A1* | 7/2021 | Sanchez ................ G06F 9/5038 |
| 2021/0263779 A1* | 8/2021 | Haghighat .............. G06F 21/78 |
| 2022/0027203 A1* | 1/2022 | Thoemmes ........... G06F 9/5055 |
| 2022/0291952 A1* | 9/2022 | Milojicic .............. G06F 9/5005 |

OTHER PUBLICATIONS

"Serverlessworkflow/specification", 6 pps., GitHub, Updated on Sep. 18, 2023, <https://github.com/serverlessworkflow/specification/blob/main/README.md>.

"AWS Lambda Service Level Agreement", May 5, 2022, 5 pps., <https://aws.amazon.com/lambda/sla/>.

"AWS Step Functions", 10 pps., printed from the Internet on Nov. 7, 2023, <https://aws.amazon.com/step-functions/?step-functions.sort-by=item.additionalFields.postDateTime&step-functions.sort-order=desc>.

"Aws-lambda-power-tuning Open Source Project", 15 pps., printed from the Internet on Nov. 7, 2023, <https://github.com/alexcasalboni/aws-lambda-power-tuning>.

"Ceate a cluster", Azure Databricks, Microsoft Learn, Nov. 7, 2023, 14 pps., <https://learn.microsoft.com/en-us/azure/databricks/clusters/configure>.

"Compute", Nov. 7, 2023, 3 pps., databricks, <https://docs.databricks.com/en/clusters/index.html>.

"Create and run Databricks Jobs", Nov. 7, 2023, databricks, 12 pps., <https://docs.databricks.com/en/workflows/jobs/create-run-jobs.html#!>.

Delimitrou et al., "Quasar: Resource-Efficient and QoS-Aware Cluster Management", 17 pps., printed from the Internet on Nov. 7, 2023, <https://www.csl.cornell.edu/~delimitrou/papers/2014.asplos.quasar.pdf>.

Gan et al., "Leveraging Deep Learning to Improve the Performance Predictability of Cloud Microservices", May 2, 2019, 15 pps., <https://arxiv.org/pdf/1905.00968.pdf>.

Hadar et al., "Scheduling For 5G Cellular Networks With Priority And Deadline Constraints", 5 pps., 2018 ICSEE International Conference on the Science of Electrical Engineering, Downloaded from the Internet on Nov. 9, 2023, <https://www.eng.biu.ac.il/spiral/files/2019/06/Scheduling-For-5G-Cellular-Networks-With-PriorityAnd-Deadline-Constraints.pdf>.

Nguyen et al., "Real-time Serverless: Enabling Application Performance Guarantees", 5 pps., WOSC '19, Dec. 9-13, 2019, Davis, CA, USA, © 2019 Copyright held by the owner/author(s). Publication rights licensed to ACM. <https://dl.acm.org/doi/abs/10.1145/3366623.3368133>.

Schuler et al., "AI-based Resource Allocation: Reinforcement Learning for Adaptive Auto-scaling in Serverless Environments", May 29, 2020, 8 pps., <https://arxiv.org/abs/2005.14410>.

Shafiei et al., "Serverless Computing: A Survey of Opportunities, Challenges and Applications", Jun. 4, 2021, 27 pps., <https://arxiv.org/abs/1911.01296>.

Singhvi et al., "Archipelago: A Scalable Low-Latency Serverless Platform", Nov. 22, 2019, 14 pps., <https://arxiv.org/pdf/1911.09849.pdf>.

Van Eyk et al., The SPEC Cloud Group's Research Vision on FaaS and Serverless Architectures>, WoSC'17, Dec. 11-15, 2017, Las Vegas, NV, USA, © 2017 Association for Computing Machinery, 5 pps.

Winzinger et al., "Model-based Analysis of Serverless Applications", 7 pps., printed from the Internet on Nov. 7, 2023, <https://www.researchgate.net/publication/334290118_Model-Based_Analysis_of_Serverless_Applications>.

* cited by examiner

SYSTEM AND APPARATUS FOR FaaS BUSINESS GOALS OPTIMIZATION

BACKGROUND

The present invention relates to novel techniques to communicate user preferences to the FaaS provider so as to provide full applicability of FaaS for business critical applications and to provide full realization of the FaaS model flexibility.

Function as a Service (FaaS) is a computing model in which a vendor provides computing resources on demand, taking care of the servers on behalf of their customers. Presently, FaaS providers offer very few guaranties to their customers. Typically, only a minimum guarantee for the FaaS service uptime is provided and with that, sometimes in an unfair manner (for example, the uptime service-level objective (SLO) may be being computed based over a total nominal billing period and not over the actual total activation time of FaaS.

Another problem is that the FaaS SLOs are not differentiated. Therefore, a customer cannot request a certain level of service reflecting their business needs associated with the FaaS invocations. Example of such needs might include, but are not limited to, deadline, reliability, cost-efficiency, latency of invocation, availability of invocations, etc.

Although FaaS customer do have some ability to choose specific level of resources (e.g., memory size, maximum life time of the container in which the function will run, etc.), these choices are mostly manual (that is decided by the user, very much in the hope that they will be sufficient on the one hand and not leading to waste of unused resources on the other hand) and static (that is all the invocations of the function will inherit these choices). Thus, these choices may be potentially not adapted to part of the function invocations since the FaaS provider scheduling of the backend resources has no way to take into consideration the business context of a specific function invocation.

This inability to communicate preferences to a FaaS provider limits applicability of FaaS for business critical applications and does not allow full realization of the FaaS model flexibility.

Thus, a need arises for techniques to communicate user preferences to the FaaS provider so as to provide full applicability of FaaS for business critical applications and to provide full realization of the FaaS model flexibility.

SUMMARY

Embodiments may include novel techniques to communicate user preferences to the FaaS provider so as to provide full applicability of FaaS for business critical applications and to provide full realization of the FaaS model flexibility. Embodiments may include a method, system, and apparatus allowing the FaaS providers to cater to the business needs of their customers by optimizing the FaaS computations in terms of business goal(s). In particular, embodiments may take into account the potential profit associated with a given business workflow, considering the direct as well as indirect gains and losses for the customers and cost to providers.

Embodiments may make FaaS infrastructure "business centric", where the user may express the business goals related to the execution of a given workload (including its performance) instead of specifying resource reservations to the FaaS infrastructure. In embodiments, a business context may gather the information needed by the FaaS infrastructure to optimize the resources allocation: on top of the business related information, including the FaaS environment parameters (e.g., global resource pressure on the actual cluster of servers that is to run the workload, what are the collocated workloads). In embodiments, the FaaS infrastructure may learn from historical invocations of similar workloads the relationship between the FaaS environment parameters and the actual performance of the workloads.

For example, in an embodiment, a method may be implemented in a computer system comprising a processor, memory accessible by the processor, and computer program instructions stored in the memory and executable by the processor, and the method may comprise receiving a request for processing of a computing task and associated data indicating a context of an overall process flow for the computing task, wherein the request for processing is a function invocation for a FaaS computing system, evaluating the data indicating the context and scheduling computing resources for performing the computing task based on the data indicating the context, and performing the computing task using the scheduled computing resources.

In embodiments, the associated data may comprise at least one benefit function that specifies a function by which a benefit to the FaaS provider may be computed. Scheduling the computing resources may comprise computing the benefit to the FaaS provider using the benefit function and scheduling the computing resources based on the benefit to the FaaS provider. Computing the benefit to the FaaS provider may comprise detecting input parameters that cause high variability to the benefit function and learning correlations between the input parameters that cause high variability and overall process flow. The associated data further may comprise at least one of an elapsed time of the process flow, costs for processing the process flow, an indication of history of previous function invocations for the process flow, and information about the FaaS system.

In an embodiment, a system may comprise a processor, memory accessible by the processor, and computer program instructions stored in the memory and executable by the processor to perform receiving a request for processing of a computing task and associated data indicating a context of an overall process flow for the computing task, wherein the request for processing is a function invocation for a FaaS computing system, evaluating the data indicating the context and scheduling computing resources for performing the computing task based on the data indicating the context, and performing the computing task using the scheduled computing resources.

In an embodiment, a computer program product may comprise a non-transitory computer readable storage having program instructions embodied therewith, the program instructions executable by a computer, to cause the computer to perform a method that may comprise receiving a request for processing of a computing task and associated data indicating a context of an overall process flow for the computing task, wherein the request for processing is a function invocation for a FaaS computing system, evaluating the data indicating the context and scheduling computing resources for performing the computing task based on the data indicating the context, and performing the computing task using the scheduled computing resources.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may include novel techniques to communicate user preferences to the FaaS provider so as to provide full applicability of FaaS for business critical applications and to provide full realization of the FaaS model flexibility. Embodiments may include a method, system, and apparatus allowing the FaaS providers to cater to the business needs of their customers by optimizing the FaaS computations in terms of business goal(s). In particular, embodiments may take into account the potential profit associated with a given business workflow, considering the direct as well as indirect gains and losses for the customers and cost to providers.

Typically, FaaS invocations are part of more complex business flows. A business flow is the process in which tasks in a business are performed. A business flow may include a number of steps, tests, alternatives, etc., to enable the business tasks to be successfully completed. A business flow definition or specification may specify the order of tasks within the business and the departments responsible for the tasks. While business flows may include steps or tasks that are performed by persons, the present techniques are concerned with those steps and tasks that are performed by computer systems, and in particular, with those steps and tasks that are performed using FaaS technology.

In embodiments, the larger business flow context may be communicated to a FaaS provider, so that it can preferentially treat function invocations. In order to reach this goal, a Business Context object may be associated with the flow (the flow can be either a flow explicitly codified using some workflow engine, or an implicit one embedded in the control flow of a client program calling FaaS).

Figure 1:
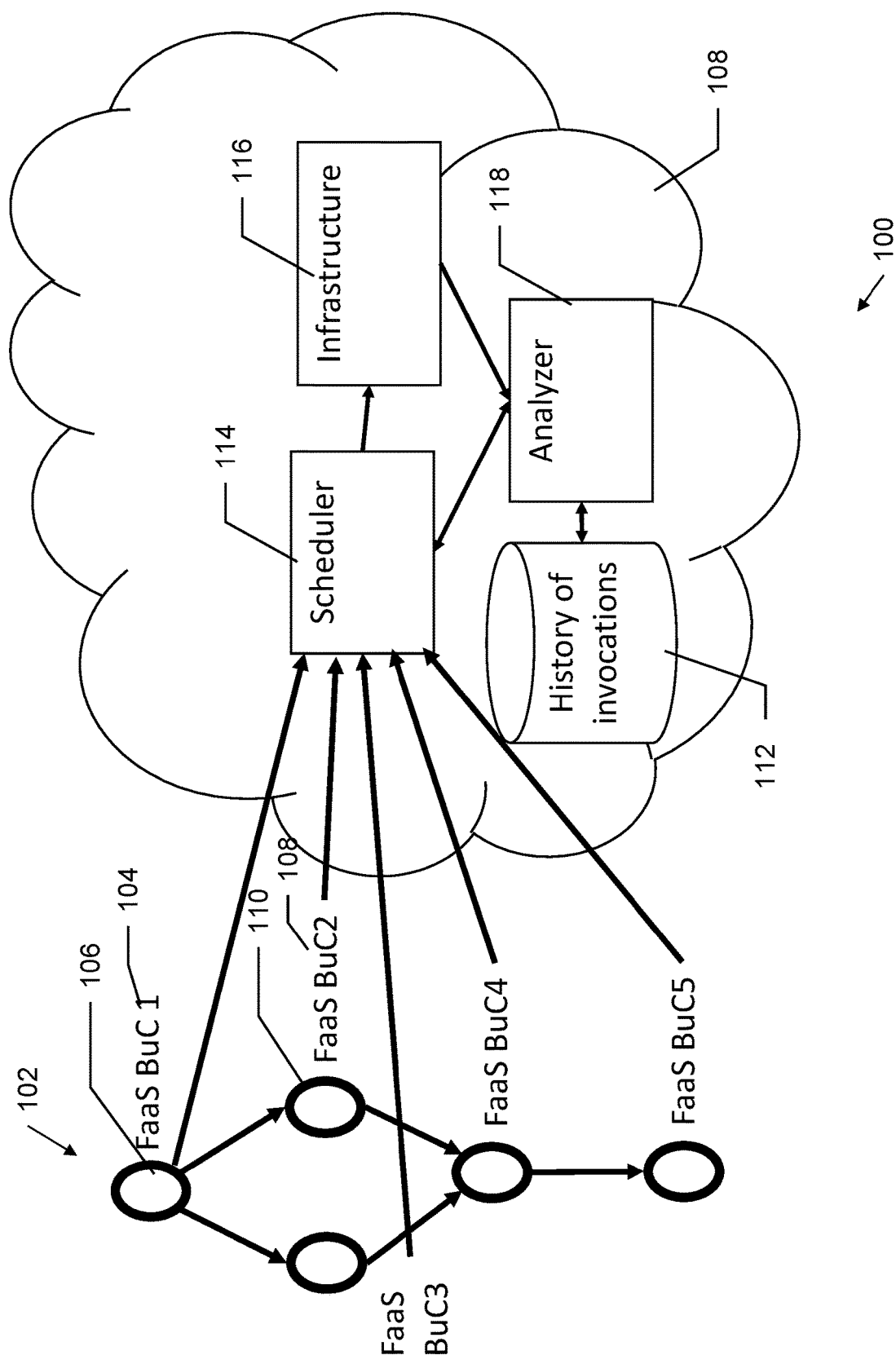
FIG. 1 is an exemplary data flow diagram of the Overall Business Context of a Business flow in a FaaS system, according to embodiments of the present techniques.

An exemplary data flow diagram of the Overall Business Context of a Business flow 100 in a FaaS system 108 is shown in FIG. 1. As shown in this example, a plurality of business flows 102 may be invoked in FaaS system 108. Business flows 102 may include individual FaaS business flow invocations, such as 106, 110, and associated Business Context objects, such as 104, 108. FaaS system 108 may include History of invocations 112, scheduler 114, infrastructure 116, and analyzer 118. History of invocations 112 may include a database of history of past invocations of business flows and previous function invocations for the business flows, wherein each invocation is associated to outcome and relevant feature parameters. Examples may include: allocated CPU and memory, cold versus warm start, the relevant business parameters, such as the input values to the FaaS flow, etc. Scheduler 114 may include hardware and software to perform assigning computing resources (processors, network links, expansion cards, etc.) to perform tasks. In this example, the tasks may include the business flows and function invocations. Infrastructure 116 may include hardware and software to execute the invoked business flows. Analyzer 118 may include hardware and software to analyze the invoked business flows, along with associated Business Context objects, such as such as 104, 108, to evaluate benefit functions included in Business Context objects 104, 108, and to optimize execution of the associated business flow.

Figure 2:
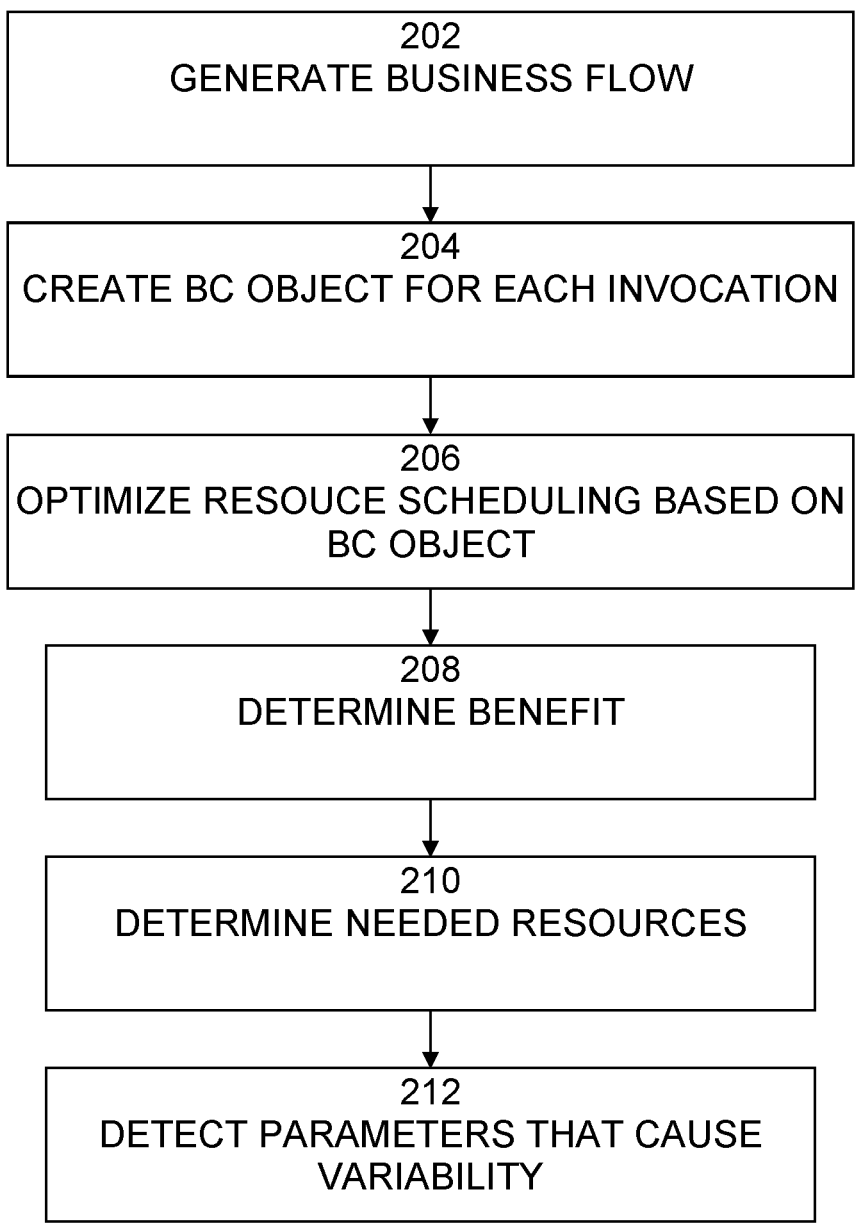
FIG. 2 is an exemplary flow diagram of process of FaaS business goals optimization, according to embodiments of the present techniques.

FIG. 1 is best viewed in conjunction with FIG. 2, which is an exemplary flow diagram of a process 200 of FaaS business goals optimization. Process 200 begins with 202, in which a business flow 102 is generated. At 204, as the business flow unfolds, a Business Context object instance, such as Business Context object instance 104, is created for each FaaS invocation, such as FaaS invocation 106, and passed as a parameter or an annotation of the call. This way, a FaaS provider system 108 would know the relative importance of a FaaS invocation to this user and therefore, at 206, can optimize resource scheduling to maximize the benefit for consumers while minimizing provider's costs.

Figure 3:
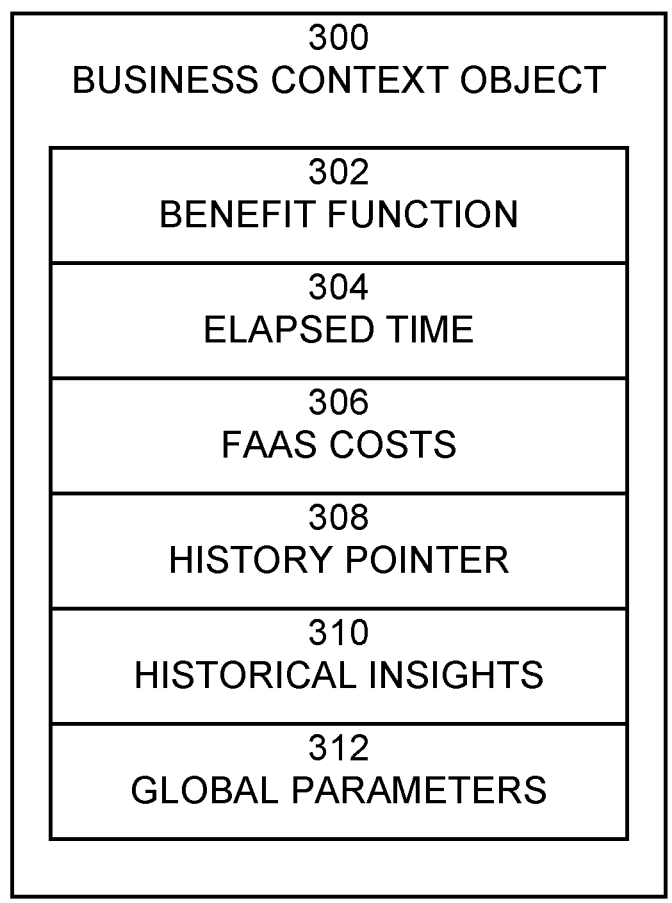
FIG. 3 is an exemplary block diagram of a Business Context object, according to embodiments of the present techniques.

An exemplary block diagram of a Business Context object 300 is shown in FIG. 3. Business Context object 300 may include a Benefit function 302, which specifies a function by which a benefit to the FaaS provider may be computed, for example, at 208 of FIG. 2. For example, assuming a business workflow of "handling of a customer payment", a first and simple sample customer profit function (benefit function 302) supplied via the Business Context to the provider may be: Benefit (deadline, cost) where deadline is the deadline by which to complete the payment flow. Setting the deadline negative would specify a failure of the flow. This function may be a black box from the point of view of the FaaS provider. That is, the function may simply accept input and provide output, with the internal operation hidden. In this example, by varying the deadline parameter, the FaaS provider can determine 208 the benefit, which is typically expressed in monetary terms.

For a given deadline value, the FaaS provider, may take advantage (for instance) of historical performance of previous invocations, and therefore have the ability to, at 210 of FIG. 2, determine the right level of resources needed for making the deadline.

As a more complex example, taking into consideration that the FaaS provider knows of the incurred cost for the allocated resources, the FaaS provider has the ability to optimize the business goal of the customer by choosing the level of deadline which will lead to the maximum for a benefit function 302 of:

$$\text{Benefit(deadline)} - \text{incurred costs(deadline)}$$

It is to be noted that Business Context object 300 may be defined per business flow and can be modified and adapted when its instances are created for FaaS invocations at the specific steps of the flow, such as Business Context object 104 for business flow 106, Business Context object 108 for business flow 110, etc. Therefore, cost-efficiency considerations may be taken into account by a FaaS provider for every FaaS invocation.

Also important is to note that the actual resource allocations are not performed at the customer level, but rather at the FaaS infrastructure level, which can take into account the combination of both the business context and the infrastructure context to take optimal decisions.

Further, at 212, input parameters which cause high variability to the Benefit function may be detected. This can occur for instance when the duration of the flow is highly variable as function of the input. When such a case is detected, in embodiments, the FaaS infrastructure may learn possible correlations between the input parameters and the business outcome where the goal is to optimize the business goals.

For example, assume that FaaS function TSP ( . . . ) implements a heuristic which solves the Traveling Salesman Problem of finding the shortest route to visit a number of cities. Embodiments may learn how parameter features such as the number of input cities are correlated to critical outcomes such as needed resources and expected computation time.

As another example, referring to the "Customer Payment Processing" example, it may be important to discover the impact of features (such as the impact of the sociodemographic segment of the targeted customer) on Benefit( ) Given these insights, the scheduler may decide for instance a) on whether or not to accelerate the computation by allocating additional resources or b) which of a possible plurality of equivalent functions should be chosen to process the current invocation. A given business functionality may be embodied by more than a single function. These functions are said to be "equivalent". Equivalent functions may differ in term of nonfunctional aspects such as the level of "user experience" and the incurred resource cost. The FaaS provider may choose a specific function to optimize the business goals of the customer (e.g., choosing the more expensive function for an invocation for which the Business Context points to a high business importance).

Turning to FIG. 3, Business Context object 300 may convey multiple and many information that may be needed for the business goal optimization. In addition to Benefit function 302, Business Context object 300, for example: the elapsed wall time 304 from the start of flow (e.g., the occurrence of a specific event which could trigger the flow). The FaaS costs 306 that were incurred until the current step for processing the flow. A pointer 308 to the history 112, shown in FIG. 1, of the previous function invocations for this business flow, wherein each invocation is associated to outcome and relevant feature parameters. Examples may include: allocated CPU and memory, cold versus warm start, the relevant business parameters, such as the input values to the FaaS flow, etc. Historical insights 310, such as the business impact of the choice of equivalent functions relevant for a given step. Global parameters 312, such as how many pre-paid GPU allocations are still available for the next period of time, etc.

At each computation stage of a given business flow, the FaaS infrastructure provider may optimize the business goal through choices for: the level of the resources allocated to the coming step, the choice of equivalent function, and possibly exceptional steps (such as agreed cancellation of the flow when for instance the already elapsed wall time when input to the Benefit function leads into a null business benefit).

In addition the business goal optimization can lead to global decisions pertaining to the business flow such as the a-priori maximum global level of resources that may be used for the business flow.

Figure 4:
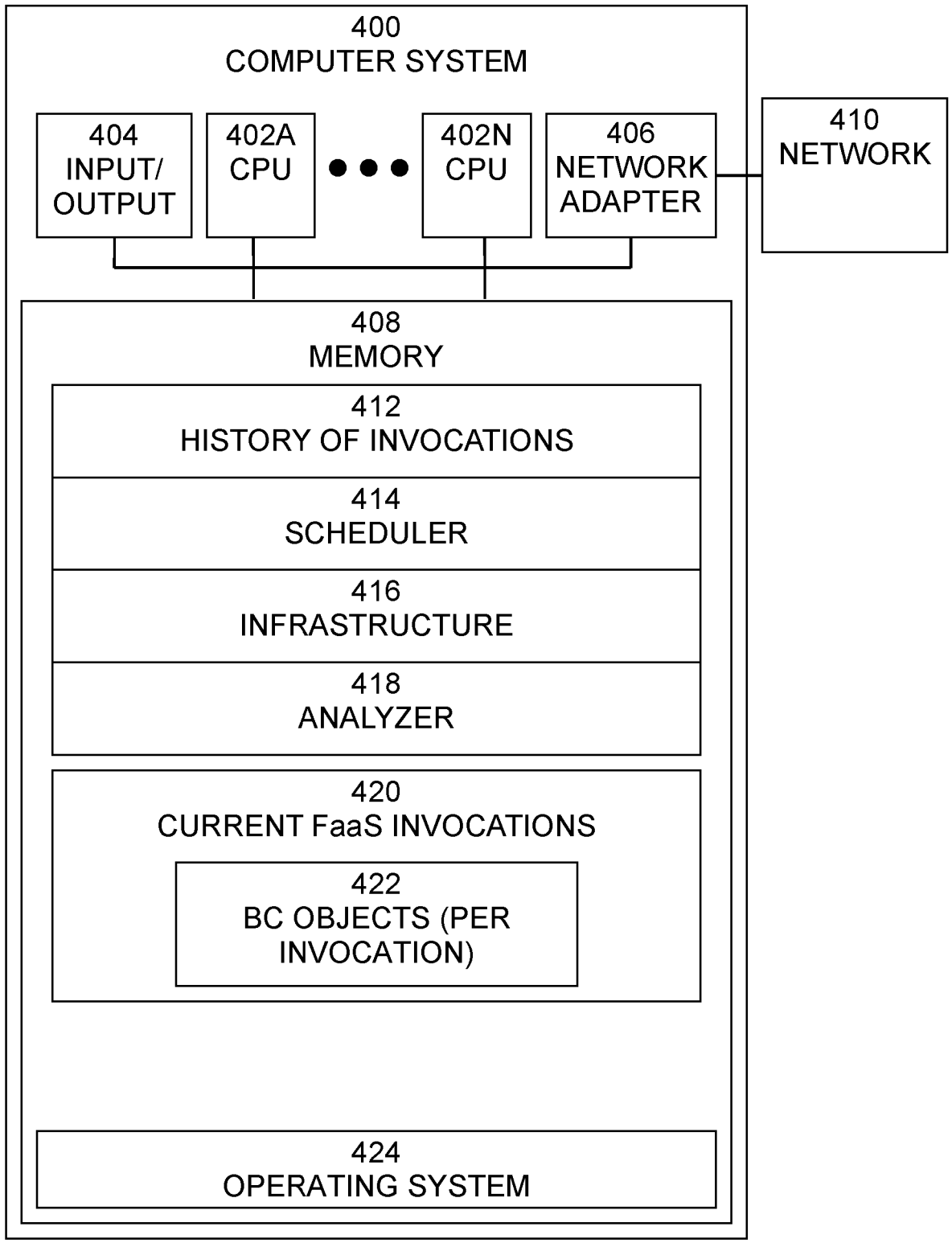
FIG. 4 is an exemplary block diagram of a computer system, in which processes involved in the embodiments described herein may be implemented.

An exemplary block diagram of a computer system 400, in which processes involved in the embodiments described herein may be implemented, is shown in FIG. 4. Computer system 400 may be implemented using one or more programmed general-purpose computer systems, such as embedded processors, systems on a chip, personal computers, workstations, server systems, and minicomputers or mainframe computers, or in distributed, networked computing environments. Computer system 400 may include one or more processors (CPUs) 402A-402N, input/output circuitry 404, network adapter 406, and memory 408. CPUs 402A-402N execute program instructions in order to carry out the functions of the present communications systems and methods. Typically, CPUs 402A-402N are one or more microprocessors, such as an INTEL CORE® processor. FIG. 4 illustrates an embodiment in which computer system 400 is implemented as a single multi-processor computer system, in which multiple processors 402A-402N share system resources, such as memory 408, input/output circuitry 404, and network adapter 406. However, the present communications systems and methods also include embodiments in which computer system 400 is implemented as a plurality of networked computer systems, which may be single-processor computer systems, multi-processor computer systems, or a mix thereof.

Input/output circuitry 404 provides the capability to input data to, or output data from, computer system 400. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 406 interfaces device 400 with a network 410. Network 410 may be any public or proprietary LAN or WAN, including, but not limited to the Internet.

Memory 408 stores program instructions that are executed by, and data that are used and processed by, CPU 402 to perform the functions of computer system 400. Memory 408 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 408 may vary depending upon the function that computer system 400 is programmed to perform. In the example shown in FIG. 4, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 4, memory 408 may include history of invocations 412, scheduler 414, infrastructure 416, analyzer 418, current FaaS invocations 420, and operating system 424. History of invocations 412 may include a database of history of past invocations of business flows and previous function invocations for the business flows, wherein each invocation is associated to outcome and relevant feature parameters. Examples may include: allocated CPU and memory, cold versus warm start, the relevant business parameters, such as the input values to the FaaS flow, etc. Scheduler 414 may include hardware and software to perform assigning computing resources (processors, network links, expansion cards, etc.) to perform tasks. In this example, the tasks may include the business flows and function invocations. Infrastructure 416 may include hardware and software to execute the invoked business flows. Analyzer 418 may include hardware and software to analyze the invoked business flows, along with associated Business Context objects 422 to evaluate benefit functions included in Business Context objects 422 and to optimize execution of the associated business flow. Current FaaS business flow invocations 420 may include or be associated with Business Context objects 422. Operating system 424 may provide overall system functionality.

As shown in FIG. 4, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method, implemented in a computer system comprising a processor, memory accessible by the processor, and computer program instructions stored in the memory and executable by the processor, the method comprising:
    receiving a request for processing of a computing task and associated data indicating a business context of an overall process flow for the computing task, wherein the request for processing is a function invocation for a Function as a service (FaaS) provider associated with a business context object;
    evaluating the data indicating the business context and scheduling computing resources for performing the computing task based on the data indicating the business context, wherein scheduling the computing resources comprises computing at least one benefit to the FaaS provider based on executing a benefit function of the business context object, wherein the benefit function include a deadline and a cost parameters, and wherein the computing comprising correlating the data and the business context; and
    performing the computing task using the scheduled computing resources based on the business context object.

2. The method of claim 1, wherein computing the benefit to the FaaS provider comprises detecting input parameters that cause high variability to the benefit function and correlating between the input parameters that cause high variability and overall process flow.

3. The method of claim 2, wherein the associated data further comprises at least one of an elapsed time of the process flow, costs for processing the process flow, an indication of history of previous function invocations for the process flow, and information about the FaaS system.

4. A system comprising a processor, memory accessible by the processor, and computer program instructions stored in the memory and executable by the processor to perform:
    receiving a request for processing of a computing task and associated data indicating a business context of an overall process flow for the computing task, wherein the request for processing is a function invocation for a Function as a service (FaaS) provider associated with a business context object;
    evaluating the data indicating the business context and scheduling computing resources for performing the computing task based on the data indicating the business context, wherein scheduling the computing resources comprises computing at least one benefit to the FaaS provider based on executing a benefit function of the business context object, wherein the benefit function include a deadline and a cost parameters, and wherein the computing comprising correlating the data and the business context; and
    performing the computing task using the scheduled computing resources based on the business context object.

5. The system of claim 4, wherein computing the benefit to the FaaS provider comprises detecting input parameters that cause high variability to the benefit function and correlating between the input parameters that cause high variability and overall process flow.

6. The system of claim 5, wherein the associated data further comprises at least one of an elapsed time of the process flow, costs for processing the process flow, an indication of history of previous function invocations for the process flow, and information about the Faas system.

7. A computer program product comprising a non-transitory computer readable storage having program instructions embodied therewith, the program instructions executable by a computer, to cause the computer to perform a method comprising:
    receiving a request for processing of a computing task and associated data indicating a business context of an overall process flow for the computing task, wherein the request for processing is a function invocation for a Function as a service (FaaS) provider associated with a business context object;
    evaluating the data indicating the business context and scheduling computing resources for performing the computing task based on the data indicating the business context, wherein scheduling the computing resources comprises computing at least one benefit to the FaaS provider based on executing a benefit function of the business context object, wherein the benefit function include a deadline and a cost parameters, and wherein the computing comprising correlating the data and the business context; and
    performing the computing task using the scheduled computing resources based on the business context object.

8. The computer program product of claim 7, wherein computing the benefit to the FaaS provider comprises detecting input parameters that cause high variability to the benefit function and correlating between the input parameters that cause high variability and overall process flow.

9. The computer program product of claim 8, wherein the associated data further comprises at least one of an elapsed time of the process flow, costs for processing the process flow, an indication of history of previous function invocations for the process flow, and information about the Faas system.

* * * * *